(12) United States Patent
Kanno

(10) Patent No.: US 9,942,728 B2
(45) Date of Patent: Apr. 10, 2018

(54) DEVICE AND METHOD OF DETERMINING A GROUP OWNER IN A WIRELESS NETWORK

(71) Applicant: Sony Corporation, Tokyo (JP)

(72) Inventor: Manabu Kanno, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 623 days.

(21) Appl. No.: 14/173,575

(22) Filed: Feb. 5, 2014

(65) Prior Publication Data

US 2015/0223029 A1   Aug. 6, 2015

(51) Int. Cl.
*H04W 4/08* (2009.01)
*H04W 8/18* (2009.01)

(52) U.S. Cl.
CPC .............. *H04W 4/08* (2013.01); *H04W 8/186* (2013.01)

(58) Field of Classification Search
CPC ....................................................... H04W 4/08
USPC ......................................................... 370/254
See application file for complete search history.

(56) References Cited

U.S. PATENT DOCUMENTS

| 2009/0175208 A1* | 7/2009 | Thubert ................ H04W 28/16 370/312 |
| 2010/0208781 A1* | 8/2010 | Wentink ............... H04B 7/0697 375/219 |
| 2011/0149816 A1 | 6/2011 | Saito et al. |
| 2011/0182280 A1* | 7/2011 | Charbit ............. H04W 56/0045 370/350 |
| 2011/0201275 A1* | 8/2011 | Jabara ................. H04L 12/5692 455/41.2 |
| 2011/0242990 A1* | 10/2011 | Simonsson ......... H04W 72/085 370/242 |
| 2012/0173620 A1* | 7/2012 | Holostov ............ H04L 67/1048 709/204 |
| 2013/0201525 A1* | 8/2013 | Niwa .................... G06F 3/1236 358/1.15 |
| 2013/0231088 A1* | 9/2013 | Jabara .................. G06Q 10/101 455/411 |
| 2014/0025801 A1* | 1/2014 | Garg ....................... H04W 4/08 709/223 |

FOREIGN PATENT DOCUMENTS

JP   2005-333648 A   12/2005

\* cited by examiner

*Primary Examiner* — Edan Orgad
*Assistant Examiner* — Nourali Mansoury
(74) *Attorney, Agent, or Firm* — Oblon, McClelland, Maier & Neustadt, L.L.P.

(57) ABSTRACT

An electronic device includes a communication interface configured to transmit and receive data on a wireless network. The electronic device includes circuitry configured to detect, when the communication interface is connected to the wireless network, a configuration change in the wireless network. The circuitry is configured to determine, based on a signal strength indication corresponding to the electronic device and a signal strength indication corresponding to one or more external devices connected to the wireless network, which of the devices connected to the wireless network is a group owner of the wireless network. The circuitry is configured to control communication on the wireless network by maintaining or changing the group owner based on the group owner determination result.

19 Claims, 6 Drawing Sheets

CHANGE IN NETWORK CONFIGURATION

COMPARE RSSI

DEVICE AND METHOD OF DETERMINING A GROUP OWNER IN A WIRELESS NETWORK

BACKGROUND

Technical Field

The present disclosure relates to determining a group owner amongst devices connected to a wireless network.

Description of Related Art

A wireless local area network (LAN) has the advantage over a wired network in that the devices connected to the LAN are free to operate within the network's range without being tethered to a wired connection. A wireless LAN system according to the Institute of Electrical and Electronics Engineers (IEEE) 802.11 standard may include an access point that operates as a base station and several other external devices that operate as slave devices, wherein the slave devices connect to the LAN via the access point. Thus, in the conventional LAN system, the base station operating as an access point and another external device operating as a slave device are necessary.

On the other hand, the Wi-Fi Direct standard specified by the Wi-Fi Alliance describes forming a wireless network amongst a plurality of devices that are connected directly. In other words, rather than accessing a wireless network via an access point, the plurality of devices that support Wi-Fi Direct can communicate directly with each of the devices in the network that also support Wi-Fi Direct.

In an exemplary Wi-Fi Direct network, each device on the network may exchange intent information indicating the respective device's priority as group owner of the network. The devices on the network may then negotiate group ownership by comparing intent values to determine which device has the highest corresponding intent value. The device with the highest intent value then becomes the group owner of the network.

There exists a method of constructing a Wi-Fi Direct network whereby an optimal terminal device becomes the group owner of the network at a time when the network is constructed. However, when another device is subsequently added to the network, the device that was originally the group owner may no longer be best suited in this role.

SUMMARY

At least in light of the above-described problems with previous methods of determining a group owner in a wireless network, the present disclosure recognizes a need for a device and method of determining a group owner in a wireless network whereby a device best suited to operate as group owner is determined following a change in a network configuration.

In one embodiment according to the present disclosure, an electronic device includes a communication interface configured to transmit and receive data on a wireless network. The electronic device includes circuitry configured to detect, when the communication interface is connected to the wireless network, a configuration change in the wireless network. The circuitry is configured to determine, based on a signal strength indication corresponding to the electronic device and a signal strength indication corresponding to one or more external devices connected to the wireless network, which of the devices connected to the wireless network is a group owner of the wireless network. The circuitry is configured to control communication on the wireless network by maintaining or changing the group owner based on the group owner determination result.

The foregoing general description of an illustrative embodiment and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
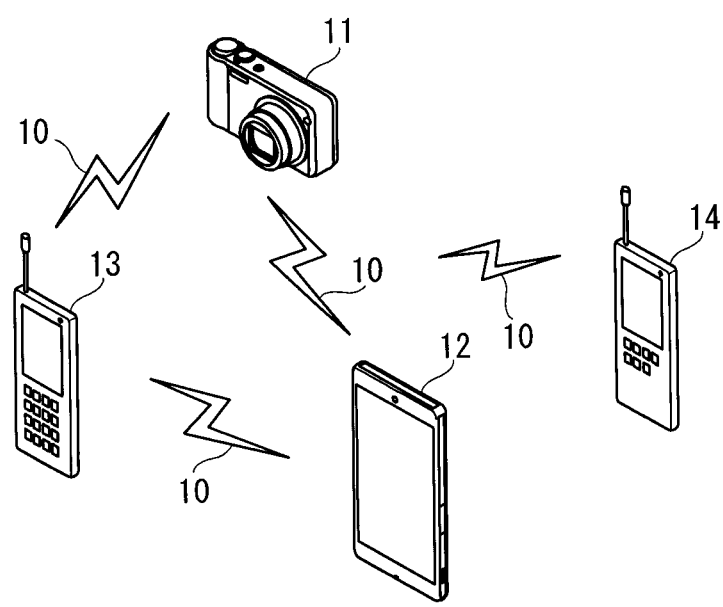
FIG. 1 illustrates a non-limiting exemplary wireless network, according to certain embodiments of the present disclosure.

Referring now to the drawings, wherein like reference numerals designate identical or corresponding parts throughout the several views.

FIG. 1 illustrates a non-limiting example of a wireless network, according to certain embodiments of the present disclosure.

Referring to FIG. 1, the exemplary wireless network illustrated in FIG. 1 includes four terminal devices: device 11, device 12, device 13, and device 14. The devices 11-14 shown in the figure are assumed to be within a predetermined distance (e.g., within several meters) from each other such that direct communication in accordance with the Wi-Fi Direct standard may be performed. Direct communication between the devices in the figure is illustrated as occurring on a wireless network 10. It is assumed that each of the devices 11-14 shown in FIG. 1 are capable of direct communication with each of the other respective devices connected on the network; however, for the sake of simplicity, a direct connection between devices on the wireless network 10 is not illustrated between each and every device in the figure.

The device 11 in this example is implemented as a digital camera. The device 12 in this example is implemented as smartphone. The devices 13 and 14 in this example are implemented as mobile telephones. However, the skilled artisan will appreciate that the present disclosure is not limited to any particular electronic device for carrying out the processing described herein with respect to forming networks and/or determining a group owner of a wireless network. Moreover, the processing described herein may be easily adapted such that it may be performed in implementations utilizing different devices than those explicitly described and illustrated herein. For example, the present disclosure may be implemented on a tablet device, a laptop computer, a portable gaming device, a television, a speaker, a display, a navigation unit, an e-reader, or the like.

Each of the devices 11-14 illustrated in FIG. 1 include a wireless communication interface capable of transmitting and receiving data across the wireless network 10 in accordance with the Wi-Fi Direct standard. In certain embodiments, the wireless communication interface included within the devices may also communicate by other communication standards. As a non-limiting example of a data transmission in the network shown in FIG. 1, the device 11 may transmit captured image data to the device 12, where the received image data may be output to a local display screen. In another non-limiting example, the device 12 may transmit a personal contact data file together with an audio file to the device 13.

As mentioned previously, the devices 11-14 may transmit various types of data across the wireless network 10 in accordance with the Wi-Fi Direct standard. In constructing a wireless network in accordance with the Wi-Fi Direct standard, each device connected to the network exchanges an intent value with each of the other devices connected to the network. Each terminal device connected to the wireless network 10 may have a characteristic value as an initial intent value. In a negotiation-based group creation, two or more devices may compete for group ownership on the wireless network 10 by exchanging their respective intent values and determining which of the devices has a highest corresponding intent value. The device determined to have the highest intent value becomes the group owner of the wireless network, while the other devices connected to the network operate as a group client. In a wireless network including only a single device, the single device operates as the group owner until another device is detected to join the wireless network. The terminal device (e.g., terminal device 11) that is determined to become the group owner of the wireless network controls communication on the network.

Figure 2:
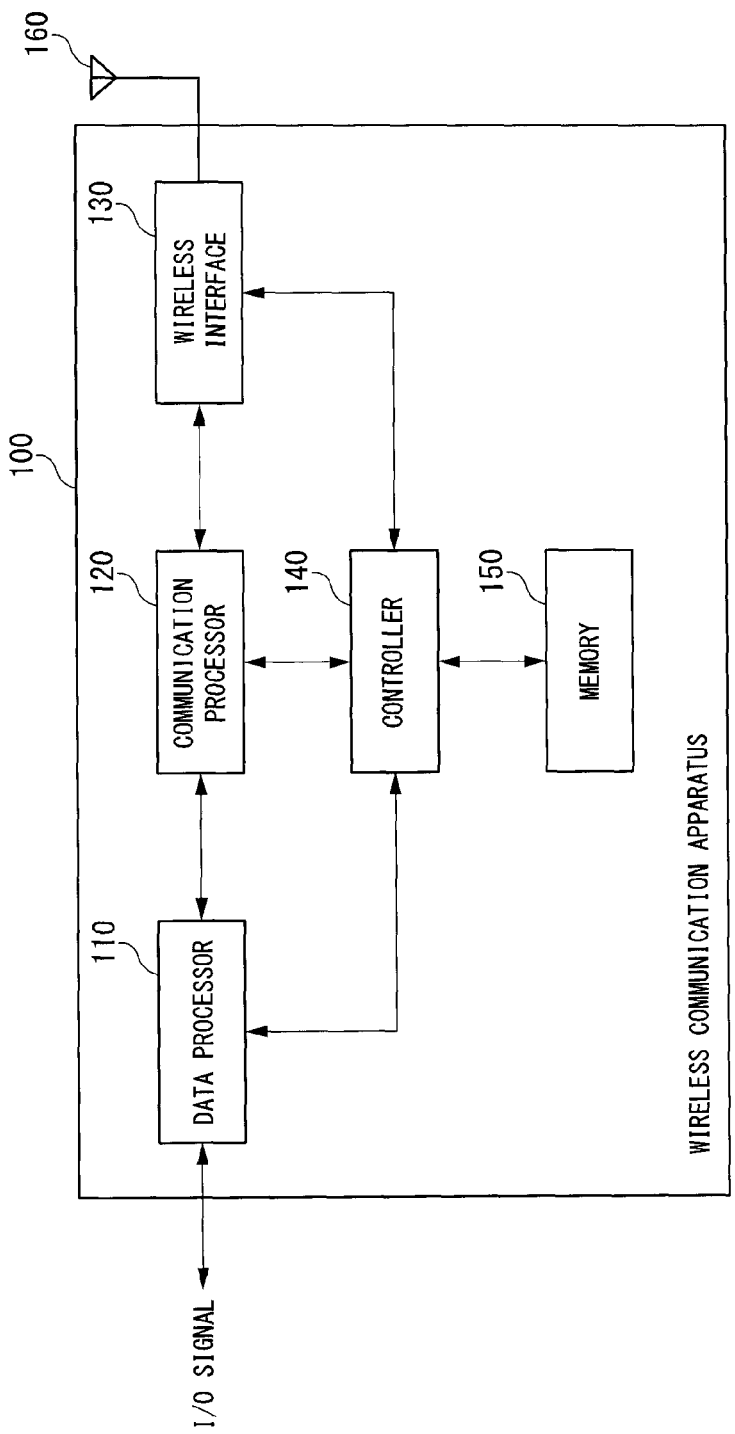
FIG. 2 illustrates a non-limiting exemplary block diagram of a wireless communication apparatus that may be included in an electronic device, according to certain embodiments of the present disclosure.

Next, FIG. 2 illustrates a non-limiting exemplary block diagram of a wireless communication apparatus that may be included in an electronic device communicating on a wireless network, according to certain embodiments of the present disclosure.

Referring now to FIG. 2, a wireless communication apparatus 100 may be included in each of the terminal devices described herein. The wireless communication apparatus 100 illustrated in FIG. 2 includes a data processor 110, a communication processor 120, a wireless interface 130, a controller 140, a memory 150, and an antenna 160.

The data processor 110 may be configured to transmit and receive input/output signals with respect to other elements of a device and/or with respect to other devices.

In an exemplary transmitting operation, the data processor 110 may create various data packets in accordance with an instruction from an upper level layer, and the created data packets may be transmitted to the communication processor 120. The communication processor 120 may perform various processing with respect to the received data packets. For example, the communication processor 120 may perform processing related to the addition of various data headers or error detecting codes such as a frame check sequence (FCS) to the packets created by the data processor 110. The data packets processed by the communication processor 120 may then be output to the wireless interface 130. The wireless interface 130 may generate a modulation signal in a frequency band of a carrier wave from the data packet received from the communication processor 120, and the wireless interface 130 may transmit the modulated data packet wirelessly as a radio wave via the antenna 160.

In an exemplary receiving operation, data received by the wireless interface 130 via the antenna 160 may be transmitted to the communication processor 120, where data may be extracted from the received data packets and transmitted to other elements of the wireless communication apparatus 100 via the data processor 110 and controller 140. The data processor 110 may process and analyze the various data received from the communication processor 120, and further processing may be executed based on the analysis of the data processor 110 under the control of controller 140.

The controller 140 may control processing related to each of the elements in the wireless communication apparatus 100, and may be configured to execute processing based on the analysis of received data packets by the data processor 110. The controller 140 may include one or more central processing units (CPUs) and may control each element in the wireless communication apparatus 100 to perform features related to communication control. Further, in certain embodiments, the controller 140 may control other device elements related to other forms a processing. For example, the controller 140 may be configured to control aspects of audio signal processing, image processing, and other kinds of signal processing executed by an electronic device in accordance with the present disclosure.

The controller 140 may perform various processing features by executing instructions stored in the memory 150 or by receiving instructions across a wireless network and/or from a non-transitory computer-readable medium having instructions stored therein. The memory 150 may include, e.g., read-only memory (ROM), random access memory (RAM), or a memory array comprised of a combination of volatile and non-volatile memory units. The memory 150 may be utilized as working memory by the controller 140 while executing the processing and algorithms of the present disclosure. Additionally, the memory 150 may be utilized for long-term storage of data and operating instructions. For example, data utilized for constructing a wireless network in accordance with the present disclosure may be stored in the memory 150 and utilized by the controller 140 for determining a group owner of the wireless network. Additionally, an intent value associated with the device in which the wireless communication apparatus 100 is operating may be stored in the memory 150. As another example, a status of group ownership within a wireless network to which the wireless communication apparatus 100 is connected may be stored in the memory 150. For example, the memory 150 may include a status indicating whether the electronic device in which the wireless communication apparatus 100 is operating is currently the group owner of a network, or an indication as to which of a plurality of devices operating on a wireless network is currently the group owner of the network. The memory 150 may also store instructions for connecting to a particular wireless network. For example, the memory 150 may store operating instructions indicating a method of connecting and communicating on a wireless network in accordance with various standards, such as the Wi-Fi Direct standard.

Figure 3:
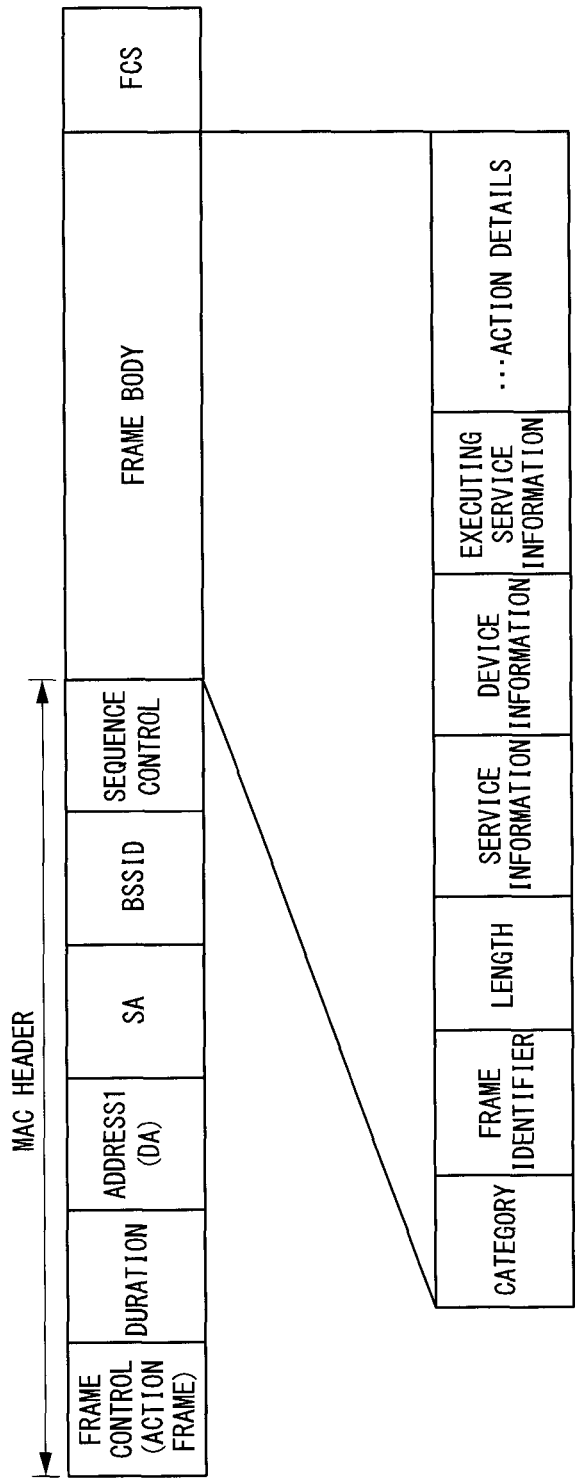
FIG. 3 illustrates a non-limiting exemplary data packet that may be transmitted in accordance with the Wi-Fi Direct standard, according to certain embodiments of the present disclosure.

Next, FIG. 3 illustrates a non-limiting exemplary data packet that may be transmitted in accordance with the Wi-Fi Direct standard, according to certain embodiments of the present disclosure.

Referring to FIG. 3, a data packet transmitted in accordance with the Wi-Fi Direct standard may include a MAC header, a frame body, and an FCS. Data utilized for network controls, such as an address of an external device, are arranged in the MAC header. Service information, device information, and executing service information may be arranged in the frame body. Service information may correspond to a data indicating a service (application) to which a transmission source device is compatible. Device information may correspond to information indicating a device type of a transmission source device. In certain embodiments, priority data indicating a relative priority claim for group ownership on a wireless network may be included in the device information. For example, an intent value specified by the Wi-Fi Direct standard may be included in the device information. Executing service information may correspond to information indicating a service that a transmission source device is currently executing.

Figure 4:
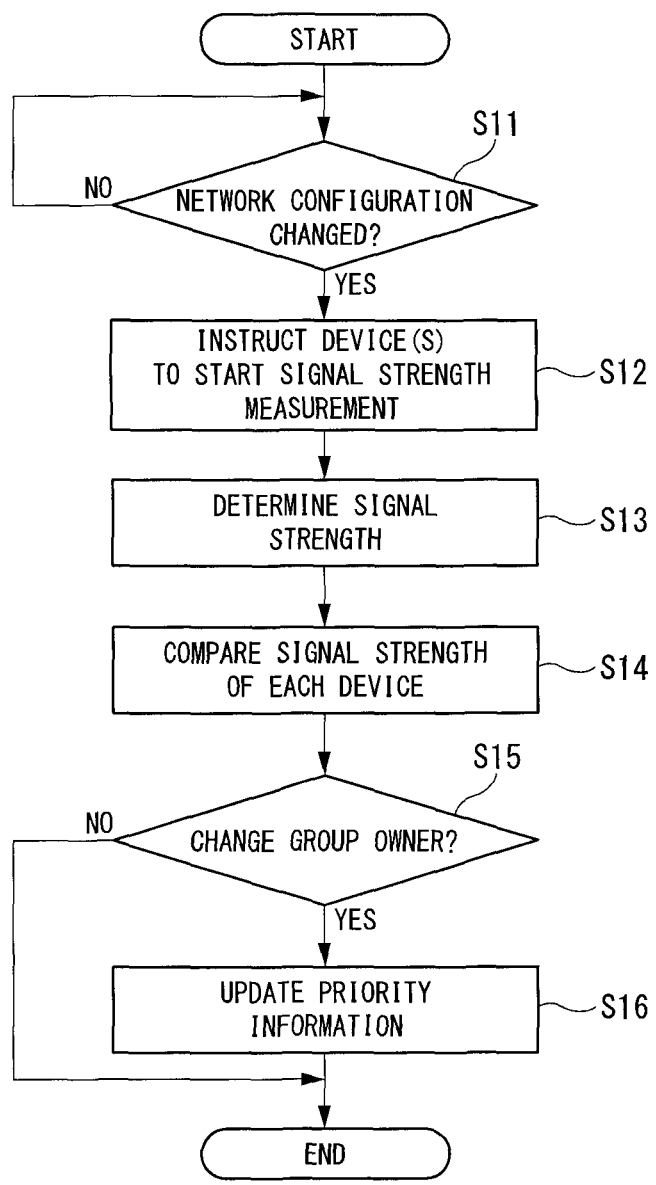
FIG. 4 illustrates a non-limiting exemplary process for determining a group owner in a wireless network, according to certain embodiments of the present disclosure.

Next, FIG. 4 illustrates a non-limiting exemplary process for determining a group owner in a wireless network, according to certain embodiments of the present disclosure.

The exemplary process of FIG. 4 begins at step S11, where the controller 140 determines whether a configuration of the wireless network has changed. In certain embodiments, the controller 140 determines whether the network configuration changed at step S11 by determining whether a number of devices connected to the wireless network changes. For example, the controller 140 may detect when a new external device establishes a connection to the wireless network 10 and in response to detecting the new external device, the controller 140 determines that the network configuration has changed by the increase in the number of devices connected to the network.

If no change in network connection is detected at step S11, the controller 140 continues monitoring for a change in the network configuration.

Otherwise, if the controller 140 detects a change in network configuration at step S11, a process for determining a signal strength indication for devices connected to the wireless network begins at step S12.

In certain embodiments, the controller 140 at step S12 instructs one or more devices connected to the wireless network to begin a process for measuring a received electric field strength (a signal strength indication) with respect to the other devices connected in a Wi-Fi Direct network. In certain embodiments, the controller 140 may instruct each of the devices connected to the Wi-Fi Direct network to determine a received signal strength indicator (RSSI) value with respect to each of the other external devices in the network.

At step S13, each external device that received the request signal transmitted at step S12 measures the received electric field strength of the signal received from the originating terminal device. At this time, an RSSI value of the signal from all of the terminals that received the request signal is measured in each terminal device.

In certain embodiments, the controller 140 at step S13 calculates an average RSSI value with respect to each external device connected to the network. The signal strength indication (e.g., RSSI) measured with respect to each of the external devices on the network may be reported to the group owner that was the originator of the request signal for measuring the signal strength indication.

At step S14, the controller 140 compares the received signal strength indication corresponding to itself with the signal strength indication corresponding to each of the devices reporting their signal strength indication in response to the request signal. For example, the originator of the request signal for detecting signal strength indications may calculate an average RSSI value based on acknowledgement signal received in response to the request signal transmission. The acknowledgement signals may be transmitted in response to the request signal by external devices that are connected on a Wi-Fi Direct network with the group owner. An average RSSI value may be calculated based on each of the respective RSSI values received from the other devices on the network. Similarly, each of the external devices that receive a request signal for determining a signal strength indication may perform a similar calculation for determining an average RSSI value of the respective external devices with respect to each of the other devices on the wireless network. The average RSSI value of each of the respective external devices may be transmitted back to the originator of the request signal, and the comparison performed at step S14 may be based on the average value of the current group owner of the wireless network with respect to the average RSSI values received at the other external devices in response to the request signal.

At step S15, the controller 140 determines whether a change in the group owner of the wireless network should occur based on the comparison of signal strength indication values performed at step S14. For example, the controller 140 in step S14 may compare the average RSSI values for each of the devices connected to the wireless network and determine that an external device other than the current group owner has the highest average RSSI value. Thus, in response to detecting that another device had a higher RSSI average value than the current group owner (e.g., the device doing the comparison), the controller 140 determines that the device with the highest average RSSI value should be the new group owner of the wireless network at step S15.

At step S16, the controller 140 performs processing for updating priority information amongst devices in the network such that the new device becomes the group owner of the network. In a network according to the Wi-Fi Direct standard, the priority information may correspond to an intent value. In other embodiments implemented in other standards, other information for determining group ownership may be updated in step S16.

In certain embodiments, the controller 140 at step S16 may update the current group owner's intent value such that the intent value is lower than the intent value corresponding to the new group owner. In other exemplary embodiments, the controller 140 may perform processing such that a signal is transmitted instructing the new group owner to update its respective intent value such that the determined new group owner has the highest intent value with respect to the other devices on the network. In the case in which the current group owner's intent value is changed (i.e., lowered), the controller 140 may execute processing such that the one or more of the other external devices on the wireless network is notified of the change. In response to the notification, the devices connected to the wireless network may perform a negotiation process for determining a group owner of the wireless network. As mentioned previously, in accordance with the Wi-Fi Direct standard, the negotiation process may include a determination as to which of the devices has the highest intent value (which has changed since the initial establishment of the network), and determining that the device with the highest intent value becomes the group owner and therefore controls communication on the wireless network.

Figure 5:
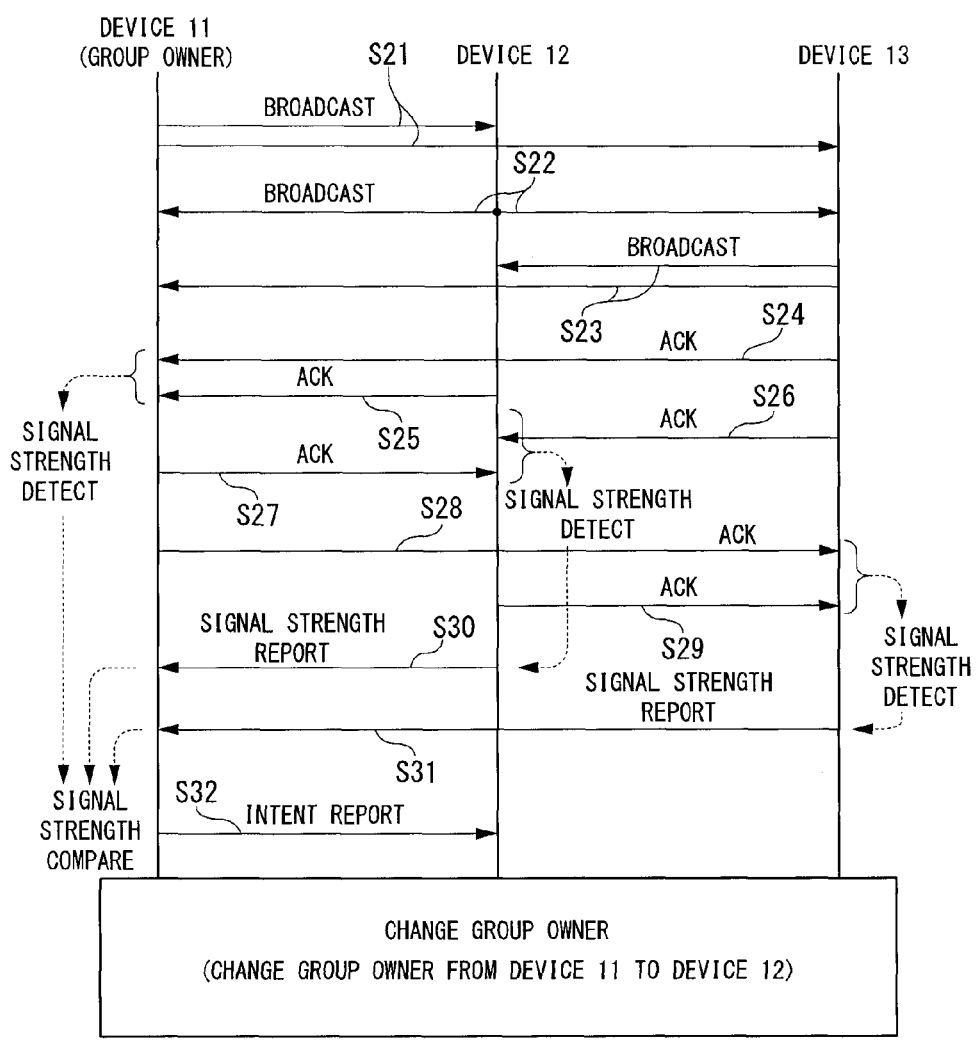
FIG. 5 illustrates a non-limiting exemplary sequential process for determining a group owner in a wireless network, according to certain embodiments of the present disclosure.

Next, FIG. 5 illustrates a non-limiting exemplary sequential process for determining a group owner in a wireless network, according to certain embodiments of the present disclosure. In particular, FIG. 5 illustrates a sequence of communication steps in which a group owner in a wireless network in accordance with the Wi-Fi Direct standard is changed.

In the example of FIG. 5, device 11 is initially the group owner of a network that includes devices 11, 12, and 13. The present example assumes that the three devices in the network communicate in accordance with the Wi-Fi Direct standard. However, the skilled artisan will appreciate that aspects of the processing described in this example and throughout the present disclosure may be adapted for performing similar determinations of group ownership based on signal strength indications in accordance with other standards.

Referring to FIG. 5, at step S21, the device 11 broadcasts a request signal to the device 12 and device 13 indicating a start of measurement of signal strength indications. In certain embodiments, the request signal transmitted from the device 11 at step S21 may cause each of the devices that receive the request signal to measure an RSSI value with respect to each of the other devices on the network. For example, as shown in step S22, in response to receiving the request signal at step S21, the device 12 transmits a similar request signal to devices 11 and 13 such that an RSSI value corresponding to device 12 with respect to the other two devices can be determined. Similarly, in response to receiving the request signal at step S21, the device 13 at step S23 transmits a request signal to devices 11 and 12 such that the device 13 may measure an RSSI value corresponding to the device 13 with respect to the devices 11 and 12.

At step S24, the device 13 transmits an acknowledgement signal to the device 11 in response to the request signal transmitted at step S21. Similarly, at step S25, the device 12 transmits an acknowledgement signal to the device 11. In certain embodiments, the controller 140 of the device 11 may then measure an RSSI value corresponding to the device 11 with respect to devices 12 and 13, based on the strength of the acknowledgement signal received from the devices 12 and 13.

Similar to the above-described case in which the group owner (i.e., device 11) determines an RSSI value corresponding to itself with respect to the other two devices, the devices 12 and 13 may also measure an RSSI value relative to the other devices on the network. For example, at step S26, the device 13 transmits an acknowledgement signal to the device 12 in response to the request signal transmitted at step S22. Similarly, the device 11 at step S27 transmits an acknowledgement signal to the device 12 in response to the request signal transmitted from the device 12 at step S22. Based on the strength of the received acknowledgement signals at step S26 and S27, the controller 140 of the device 12 may measure an RSSI value corresponding to the device 12 with respect to devices 11 and 13. The controller 140 of the device 13 performs a similar process at steps S28 and S29 (i.e., receiving acknowledgement signals from the other devices connected to the wireless network and determining an RSSI value corresponding to the device 13 with respect to devices 11 and 12).

In certain embodiments, the processing described above with respect to steps S24-S29 may include calculating an average signal strength indication value (e.g., an average RSSI value) for each device with respect to the other devices on the network. Taking the exemplary process of determining a signal strength indication of the device 11 with respect to devices 12 and 13 as an example, the controller 140 of the device 11 may determine an RSSI value of the device 11 with respect to the device 13 by measuring a strength of the acknowledgement signal received at step S24, and similarly calculate an RSSI value corresponding to the device 11 with respect to the device 12 by measuring a strength of the acknowledgement signal received at step S25. The controller 140 of device 11 may then calculate an average signal strength indication value corresponding to the device 11 with respect to devices 12 and 13, based on the measured strength of the two acknowledgment signals. In certain embodiments, the average signal strength indication corresponds to an average RSSI value derived from the two acknowledgement signals received at steps S24 and S25. Similar processing for calculating an average signal strength indication value may be carried out for both the devices 12 and 13.

As mentioned previously, the device 11 is assumed to initially be the group owner in this example, and the process of determining group ownership within the network was initiated by the device 11. In certain embodiments, a process for determining a group owner of a wireless network includes a comparison of signal strength indication values of each device operating on the network and selecting as the group owner the device having the highest signal strength indication value. For example, the device 12 at step S30 may transmit a signal strength indication report (an RSSI report) to the device 11 reporting the signal strength indication corresponding to the device 12 with respect to devices 11 and 13. In certain embodiments, the signal strength indication value reported at step S30 represents an average signal strength indication of the device 12 with respect to devices 11 and 13. Similar to the example for device 12, the device 13 at step S31 may also transmit to the device 11 a report indicating the signal strength indication of the device 13 with respect to the devices 11 and 12. The signal strength indication transmitted at step S31 may represent an average signal strength indication corresponding to the device 13 with respect to devices 11 and 12.

After receiving reports from each of the devices connected to the network indicating a signal strength indication value with respect to the other devices on the network, the controller 140 of the device 11 at step S32 compares the received signal strength indication values to determine which of the signal strength indication values has a highest magnitude. As mentioned previously, a wireless network operating in accordance with the Wi-Fi Direct standard selects a group owner based on which of the devices operating on the network initially has the highest intent value. Thus, when the network as in the example of FIG. 5 was initially formed, it may be assumed that the device 11 initially had the highest intent value when the network was established. However, in response to determining a change in network configuration (e.g., a new device joining the network), the device 11 may perform a process similar to the process in FIG. 5 of determining group ownership of the wireless network. This determination may include a comparison such as that illustrated in step S32, whereby the reported signal strength indication values of each of the devices on the network are compared. In this example it is determined that the device 12 has the highest signal strength indication value magnitude with respect to the other devices on the network. As a result of this determination, the device 11 may update priority information corresponding to relative priority of ownership of the network within the group. In certain embodiments, the device 11 may update its intent value stored in the memory 150 such that the intent value is lower than the corresponding intent value of the device 12. In other embodiments, the device 11 may transmit a signal to the device 12 indicating that the device 12 should be the new group owner, and instructing the device 12 to update its stored intent value such that the intent value is higher than the other devices. In the case in which the device 11 updates its intent values such that it is lower than the intent value of the device 12, the device 11 may transmit an intent report at step S32 notifying the device 12 that it is the new group owner of the wireless network, and communication amongst devices operating on the network will be controlled by the device 12 acting as the group owner.

Figure 6:
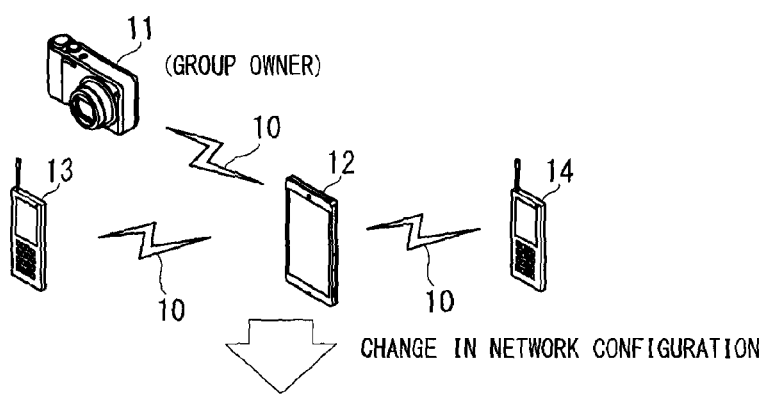
FIG. 6 illustrates a non-limiting exemplary result of detecting a change in a network configuration, according to certain embodiments of the present disclosure.
Figure 6:
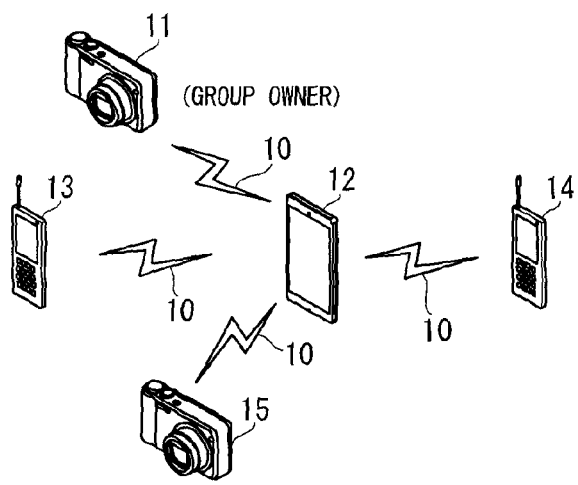
Figure 6:
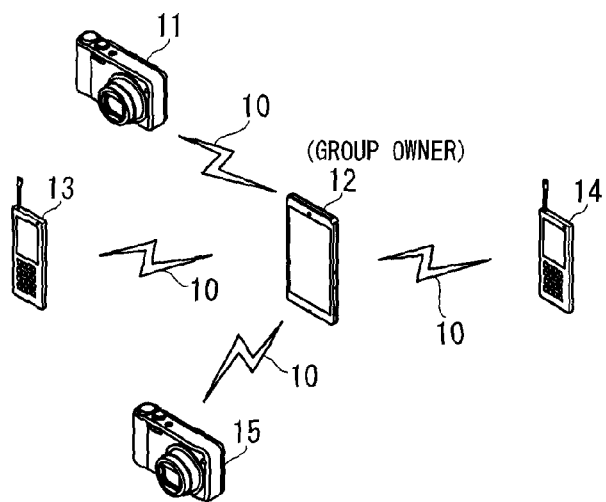

Next, FIG. 6 illustrates a non-limiting exemplary result of detecting a change in a network configuration, according to certain embodiments of the present disclosure. In particular, the example of FIG. 6 illustrates a change in network configuration whereby a new device joins a wireless network group, and in response to the detected change in network configuration, the group owner of the wireless network performs a process of determining group ownership of the network, which results in a change in group ownership to another device.

Referring now to FIG. 6, a group network in accordance with the example of FIG. 6 initially includes devices 11, 12, 13, and 14, which may be assumed to operate within the group network in accordance with the Wi-Fi Direct standard such that each of the devices may communicate directly with one another. It is assumed that communication amongst the four devices in the network is controlled by the terminal device 11 acting as group owner.

Following initial construction of the network illustrated in FIG. 6, a detection of a change in network configuration corresponding to an increase in the number of external devices connected to the network is detected. In particular, it is determined that a new external device illustrated as device 15 joins the group network. In certain embodiments, the detection that the device 15 joins the network may be detected by the group owner. In other embodiments, a client device operating on the network may initially detect the change in network configuration and report the change to the group owner.

Following the detected change in network configuration, a process for determining the group owner of the network is then initiated. In certain embodiments, the controller 140 of the device 11 may initiate the process of determining the group owner, and the process may be similar to the exemplary process illustrated in FIG. 5. That is, each of the devices connected to the network may determine a signal strength indication of each respective device with respect to the other devices on the network. The respective signal strength indication values may then be compared by the controller 140 of the device 11, and the device 11 may initiate a change in group ownership if the signal strength indication values indicate that another device is more suitable to act as the group owner. In certain embodiments, the signal strength indication values may be average values of the device with respect to the other devices, as discussed above for FIG. 5. In certain embodiments, the signal strength indication values correspond to RSSI values.

In the example of FIG. 6, the device 11 determines that the device 14 has the highest signal strength indication value. In response to detecting that the device 14 has the highest signal strength indication value, the controller 140 of the device 11 may update priority information indicating a respective group ownership priority within the network such that the device 14 has highest priority. In certain embodiments, the controller 140 may update its intent value such that the intent value of the device 11 is lower than the intent value of the device 14. In other embodiments, the device 11 may output an instruction to the device 14 indicating that the device 14 is the new group owner and instructing the device 14 to update its intent value above the intent value of the device 11. A report of the change in group ownership may be transmitted from the device 11 to the new group owner (i.e., device 14).

The above exemplary embodiments were described in the context of a network operating in accordance with the Wi-Fi Direct standard. However, one of ordinary skill will appreciate that the processes and algorithms described herein may be adapted such that group ownership is determined based on signal strength indications of devices relative to one another within the context of other communication standards. Moreover, the present disclosure is not limited to a change in control of a group of devices operating on a wireless network based on changes in intent value.

Further, processing described herein may be performed in response to changes in a network configuration other than a change in a number of devices connected to the network. Moreover, the processing described herein does not necessarily need to be performed in response to a network configuration change, and instead may be performed at an arbitrary time.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The above disclosure also encompasses the embodiments noted below.

(1) A electronic device comprising: a communication interface configured to transmit and receive data on a wireless network; and circuitry configured to detect, when the communication interface is connected to the wireless network, a configuration change in the wireless network; determine, based on a signal strength indication corresponding to the electronic device and a signal strength indication corresponding to one or more external devices connected to the wireless network, which of the devices connected to the wireless network is a group owner of the wireless network; and control communication on the wireless network by maintaining or changing the group owner based on the group owner determination result.

(2) The electronic device according to (1), wherein the determination as to which of the devices connected to the wireless network is the group owner includes: comparing the signal strength indication corresponding to the electronic device with the signal strength indication corresponding to the one or more external devices, and selecting either the electronic device or one of the one or more external devices as the group owner depending on which of the devices has a highest magnitude signal strength indication.

(3) The electronic device according to (1) or (2), wherein when the electronic device is initially the group owner and one of the one or more external devices has the highest magnitude signal strength indication, the circuitry changes the group ownership by updating priority information indicating a relative group ownership priority of the respective devices.

(4) The electronic device according to any one of (1) to (3), wherein the group ownership is changed from the electronic device to the external device by decreasing the electronic device's priority information below the external device's priority information.

(5) The electronic device according to any one of (1) to (4), wherein the group ownership is changed from the electronic device to the external device by increasing the external device's priority information above the electronic device's priority information.

(6) The electronic device according to any one of (1) to (5), wherein the circuitry is configured to detect the configuration change in the wireless network when a number of the external devices connected to the wireless network increases.

(7) The electronic device according to any one of (1) to (6), wherein the communication interface is configured to communicate with the one or more external devices in accordance with the IEEE 802.11 standard.

(8) The electronic device according to any one of (1) to (7), wherein the circuitry is configured to change the group owner of the wireless network by updating an intent value of one of the devices connected to the wireless network.

(9) The electronic device according to any one of (1) to (8), wherein the circuitry is configured to change the group owner by updating the intent value such that the device, of the devices connected to the wireless network, determined to be the group owner has the highest intent value.

(10) The electronic device according to any one of (1) to (9), wherein the devices connected to the network negotiate which of the devices is the group owner based on a comparison of each device's intent value with respect to the other devices' intent values.

(11) The electronic device according to any one of (1) to (10), wherein the signal strength indication corresponds to a received signal strength indicator (RSSI).

(12) The electronic device according to any one of (1) to (11), wherein the circuitry is configured to change the group owner by updating an intent value as specified by the Wi-Fi Direct standard.

(13) The electronic device according to any one of (1) to (12), wherein the determination as to which of the devices connected to the wireless network is the group owner includes: transmitting, to the one or more external devices, via the communication interface, a request to obtain the signal strength indication corresponding to the one or more external devices; measuring, based on a response to the request received from the one or more external devices, the signal strength indication corresponding to the electronic device; receiving, in response to the request, the signal strength indication corresponding to the one or more external devices; and determining the group owner based on a comparison of the signal strength indication corresponding to the electronic device and the signal strength indication corresponding to the one or more external devices.

(14) The electronic device according to any one of (1) to (13), wherein the circuitry is configured to calculate, based on the response received from the one or more external devices, an average signal strength indication value corresponding to the electronic device.

(15) The electronic device according to any one of (1) to (14), wherein the circuitry is configured to determine the group owner based on a comparison of the average signal strength indication value corresponding to the electronic device relative to respective average signal strength indication values received from the one or more external devices.

(16) The electronic device according to any one of (1) to (15), wherein the respective average signal strength indication values are received from the one or more external devices in response to the request sent by the electronic device.

(17) The electronic device according to any one of (1) to (16), wherein the request is configured to cause each of the devices connected to the wireless network to measure their respective signal strength indication with respect to every other device connected to the wireless network and report the result to an originator of the request.

(18) The electronic device according to any one of (1) to (17), wherein when the circuitry determines that the electronic device is the group owner, the circuitry is configured to control communication between the electronic device and the one or more external devices on the wireless network.

(19) A method of controlling group ownership of a wireless network, the method comprising: detecting, by circuitry, a configuration change in the wireless network; determining, by the circuitry, based on a signal strength indication corresponding to a first device and a signal strength indication corresponding to one or more external devices on the wireless network, which of the devices connected to the wireless network is a group owner of the wireless network; and controlling, by the circuitry, communication on the wireless network by maintaining or changing the group owner based on the group owner determination result.

(20) A non-transitory computer readable medium having instructions stored therein that when executed by one or more processors cause an electronic device to perform a method of controlling group ownership of a wireless network, the method comprising: detecting a configuration change in the wireless network; determining, based on a signal strength indication corresponding to the electronic device and a signal strength indication corresponding to one or more external devices on the wireless network, which of the devices connected to the wireless network is a group owner of the network; and controlling communication on the wireless network by maintaining or changing the group owner based on the group owner determination result.

The invention claimed is:

1. An electronic device comprising:
a communication interface configured to transmit and receive data on a wireless network; and
circuitry configured to:
detect, when the communication interface is connected to the wireless network, an increase in a number of devices connected in the wireless network;
determine, based on a signal strength indication corresponding to the electronic device and a signal strength indication corresponding to one or more external devices connected to the wireless network, which of the devices connected to the wireless network is a group owner of the wireless network;
control communication on the wireless network by maintaining or changing the group owner based on the group owner determination result; and
change the group owner of the wireless network based on an intent value of one of the devices connected to the wireless network, the intent value corresponding to priority information included in device type information of the one of the devices.

2. The electronic device according to claim 1, wherein the determination as to which of the devices connected to the wireless network is the group owner includes:
comparing the signal strength indication corresponding to the electronic device with the signal strength indication corresponding to the one or more external devices, and
selecting either the electronic device or one of the one or more external devices as the group owner depending on which of the devices has a highest magnitude signal strength indication.

3. The electronic device according to claim 1, wherein when the electronic device is initially the group owner and an electronic device of the one or more external devices having a highest magnitude signal strength indication, the circuitry changes the group owner by updating priority information indicating a relative group ownership priority of the devices connected to the wireless network.

4. The electronic device according to claim 3, wherein the group owner is changed from the electronic device to the external device by decreasing the electronic device's priority information below the external device's priority information.

5. The electronic device according to claim 3, wherein the group owner is changed from the electronic device to the external device by increasing the external device's priority information above the electronic device's priority information.

6. The electronic device according to claim 1, wherein the communication interface is configured to communicate with the one or more external devices in accordance with the Institute of Electrical and Electronics Engineers (IEEE) 802.11 standard.

7. The electronic device according to claim 6, wherein the circuitry is configured to change the group owner of the wireless network by updating the intent value of the one of the devices connected to the wireless network.

8. The electronic device according to claim 7, wherein the circuitry is configured to change the group owner by updating the intent value such that the device, of the devices connected to the wireless network, determined to be the group owner that has a highest intent value.

9. The electronic device according to claim 8, wherein the devices connected to the network negotiate which of the devices is the group owner based on a comparison of each device's intent value with respect to intent values of other devices of the devices connected to the network.

10. The electronic device according to claim 6, wherein the signal strength indication corresponds to a received signal strength indicator (RSSI).

11. The electronic device according to claim 1, wherein the circuitry is configured to change the group owner by updating the intent value as specified by a Wi-Fi Direct standard.

12. The electronic device according to claim 1, wherein the determination as to which of the devices connected to the wireless network is the group owner includes:
transmitting, to the one or more external devices, via the communication interface, a request to obtain the signal strength indication corresponding to the one or more external devices;
measuring, based on a response to the request received from the one or more external devices, the signal strength indication corresponding to the electronic device;
receiving, in response to the request, the signal strength indication corresponding to the one or more external devices; and
determining the group owner based on a comparison of the signal strength indication corresponding to the electronic device and the signal strength indication corresponding to the one or more external devices.

13. The electronic device according to claim 12, wherein the circuitry is configured to calculate, based on the response received from the one or more external devices, an average signal strength indication value corresponding to the electronic device.

14. The electronic device according to claim 13, wherein the circuitry is configured to determine the group owner based on a comparison of the average signal strength indication value corresponding to the electronic device relative to respective average signal strength indication values received from the one or more external devices.

15. The electronic device according to claim 14, wherein the respective average signal strength indication values are received from the one or more external devices in response to the request sent by the electronic device.

16. The electronic device according to claim 12, wherein the request is configured to cause each of the devices connected to the wireless network to measure their respective signal strength indication with respect to every other device connected to the wireless network and report a result to an originator of the request.

17. The electronic device according to claim 1, wherein when the circuitry determines that the electronic device is the group owner, the circuitry is configured to control communication between the electronic device and the one or more external devices on the wireless network.

18. A method of controlling a group ownership of a wireless network, the method comprising:
detecting, by circuitry, an increase in a number of devices connected in the wireless network;
determining, by the circuitry, based on a signal strength indication corresponding to a first device and a signal strength indication corresponding to one or more external devices on the wireless network, which of the devices connected to the wireless network is a group owner of the wireless network;

controlling, by the circuitry, communication on the wireless network by maintaining or changing the group owner based on the group owner determination result; and changing the group owner of the wireless network based on an intent value of one of the devices connected to the wireless network, the intent value corresponding to priority information included in device type information of the one of the devices.

19. A non-transitory computer readable medium having instructions stored therein that when executed by one or more processors cause an electronic device to perform a method of controlling group ownership of a wireless network, the method comprising:

detecting an increase in a number of devices connected in the wireless network;

determining, based on a signal strength indication corresponding to the electronic device and a signal strength indication corresponding to one or more external devices on the wireless network, which of the devices connected to the wireless network is a group owner of the wireless network;

controlling communication on the wireless network by maintaining or changing the group owner based on the group owner determination result; and changing the group owner of the wireless network based on an intent value of one of the devices connected to the wireless network, the intent value corresponding to priority information included in device type information of the one of the devices.

* * * * *